Patented Jan. 28, 1930

1,744,880

UNITED STATES PATENT OFFICE

WILLIAM C. GEER, OF AKRON, OHIO, ASSIGNOR TO THE B. F. GOODRICH COMPANY, OF NEW YORK, N. Y., A CORPORATION OF NEW YORK

ADHESIVE MATERIAL

No Drawing.    Application filed February 9, 1925. Serial No. 8,057.

This invention relates to adhesives, and its object is to provide substances of this class having superior capacity for sticking to faces of various commonly-used materials. I have found a surprisingly high sticking quality to exist in certain artificial, tough, heat-plastic isomers of rubber, heretofore proposed for making molded goods and electrical insulation and for other uses not analogous to my present discovery.

These isomers more or less resemble balata in some of their physical properties in that they are tough, fairly hard, plastic when heated, soluble in the ordinary rubber solvents, such as benzene, p-cymene, gasoline, turpentine, "tetralin," "decalin", chloroform, carbon tetrachloride, and carbon disulfide, and good electrical insulators, but they are far superior to balata or gutta percha in surface adhesion. They have less chemical unsaturation than rubber, and being isomers of rubber, they contain, in a pure state, no combined oxygen and are not allied to the resins, being substantially insoluble in alcohol, ether or acetone.

Such substances may be prepared by reacting undissolved rubber, namely rubber not in liquid solution, under the influence of heat, with various isomerizing agents and particularly sulfonic reagents having the general formula $R-SO_2-X$, wherein R represents an organic radical or a hydroxy group and X represents a hydroxy group or chlorine, examples being organic sulfonyl chlorides, organic sulfonic acids and sulfuric acid or mixtures of two or more of these.

As an example of the preparation of the tough, balata-like rubber isomer, 7½ parts by weight of p-phenol sulfonic acid are mixed directly into 100 parts of undissolved rubber while being worked on a rubber mill, or otherwise, and when thoroughly mixed the material is removed from the mill and heated in a compact mass in an oven for 4 to 10 hours at 120 to 145° C. In about two to eight hours after starting the heating, depending on how rapidly the batch heats up, a pronounced exothermal reaction sets in, the temperature in the material rising to 200–230° C., and quantities of vapors and gases are given off. The heating should be continued for about two hours beyond the peak of the exothermal temperature rise.

Instead of the p-phenol sulfonic acid of the above example one may employ any of the following (a) 4½ parts of concentrated sulfuric acid (sp. gr. 1.84), (b) p-toluene sulfonic acid—7½ parts, (c) p-phenol sulfonic acid—5 parts and concentrated sulfuric acid—1 part.

After removal from the oven, the product is worked or masticated on a warm mill to homogenize it, and may be washed free of remaining reagent and other water-soluble impurities during that process.

An alternative procedure is to form the sulfonic compounds in the rubber mass by adding to the raw rubber suitable organic compounds and sulfuric acid and producing a reaction between the two and the rubber during the heating of the mixture. Thus, when sulfuric acid and either phenol, pine tar or naphthalene are mixed directly into the raw rubber, the sulfuric acid reacts in part with the rubber and in part with the other organic compound to form a sulfonic compound which also reacts with the rubber.

These balata-like derivatives of rubber, which constitute my adhesive material or the principal ingredient thereof, are found, upon analysis, to be hydrocarbons having the same carbon and hydrogen ratio as in rubber $(C_5H_8)_x$. They are however, chemically less unsaturated than rubber. They are isomers of rubber, using that term in the generic sense. These isomers, when purified by washing, having a specific gravity of about .97 to 1.00. They are heat-plastic, softening at 55 to 105° C. and having a somewhat indefinite melting point but not substantially higher than 275° C.

The invention is not wholly limited to a product made with reagents of the class mentioned, but includes rubber isomers of the type described, no matter how produced.

The character and amount of the reagent employed and the time and conditions of cure have an important effect on the physical character of the product. Generally speaking, an increment in time, temperature or amount of the reagent used will produce harder products not quite as suitable as the softer ones. The reaction may be carried so far as to produce hard, brittle, shellac-like products which are readily grindable to a powder and may replace more or less of the softer, tougher product in recipes for particular uses. For instance, if the examples above given are varied by using 8 parts of p-toluene sulfonic acid, 2 parts concentrated sulfuric acid, (sp. gr. 1.84) and 2 parts water to 100 parts of rubber and heating for 8 hours at 140° C., the hard, brittle product results.

I find it desirable in some cases to mix about 10 per cent, more or less, of an organic flux or softener such as tung oil, castor oil, hard mineral rubber, naphthalene or Canada balsam with the balata-like rubber isomer. This improves the workability and solubility in solvents. A further effect of using certain of these fluxes or softeners, such as tung oil, castor oil or Canada balsam, in a solution of the adhesive, is to delay the drying of the latter. An admixture of the adhesive with mineral rubber causes the compound to retain its tack for a longer time and also cheapens it. The use of these fluxes or softeners, however, is not essential, as the rubber isomer itself possesses superior adhesive properties.

I also prefer to add about 1 to 5 per cent of a suitable nitrogenous, organic preservative or age-resister. Age-resisters which have successfully been used are (1) the thiourea of dimethylparaphenylenediamine, (2) 1,8 naphthylene-diamine, (3) aldol-alphanaphthylamine and (4) benzidine.

As an example of my invention, for an adhesive of general application, I mix together on a mill, ingredients in parts by weight as follows:

| | |
|---|---|
| Balata-like, artificial rubber isomer | 86 |
| Aldol-alphanaphthylamine | 3 |
| Benzidine | 1 |
| Tung oil | 10 |
| | 100 |

The substitution of other softeners for a part or all of the tung oil may be desirable for particular uses. The replacement of part of the balata-like rubber isomer by the previously-mentioned hard, friable product of the same class of reaction, and in general the addition or partial substitution of shellac, hard resins, rubber and numerous other ingredients may be effected when desired. The hard, friable, shellac-like isomer may entirely replace the tough, balata-like isomer as a substitute for shellac adhesives. Certain three-component mixtures of the tough, balata-like and hard, grindable rubber isomers with rubber are found to age well without the addition of any of the before-mentioned age-resisters.

This adhesive may be used directly, in thin sheet form or tissue, as a bond or coating, or it may be dissolved in a volatile solvent, such as benzol, and painted on the surface or surfaces on which it is to be used. When two objects are to be connected, if it is practicable to heat them and soften the cementitious material, before or while pressing the objects together, an especially firm joint is obtained. When using the adhesive for attaching rubber to other surfaces such as metal, I sometimes employ rubber cement next to the rubber.

Various recipes using the balata-like rubber isomer as a sticking agent have been tested and found to show remarkably strong adhesion on most of the common metals, wood, glass, concrete, leather, rubber, etc. The adhesion to ferrous metal may be taken as an instance. Test samples were prepared by sand-blasting plates of steel, painting them with a benzol solution of the adhesive, similarly painting pieces of woven cotton fabric having a friction coating of vulcanizable rubber, and after evaporation of the solvent, placing the coated sides together and curing in a press for 45 minutes at 145° C. After curing, the samples were allowed to stand for 24 hours and friction pull tests were run on a suitable machine, strips of the fabric one inch wide being pulled. The adhesions shown varied from 20 to 65 pounds per inch, an average being about 35 pounds. Ordinary rubber cement under similar conditions gives adhesions of the order of 3 pounds per inch—gutta percha and balata 1 to 1.5 pounds and balata or gutta percha in a standard recipe with other ingredients such as shellac, litharge, storax, and gum mastic with turpentine as a solvent, 2 to 3.5 pounds. In the same standard recipe, by substituting the balata-like rubber isomer for the balata or gutta percha, adhesisions of 32 to 35 pounds per inch were obtained.

Films of the tough, balata-like rubber isomer are suitable, without substantial modification of their properties, as an under-coating on surfaces protected by ordinary paints, particularly ferrous metal surfaces. They lend durability to the paint coating by reason of their high adhesion and ability to prevent rust and corrosion.

The term "rubber" is employed herein in the sense in which this term is generally used in the scientific literature to indicate a caoutchouc substance having an empirical formula $(C_5H_8)_x$ and a degree of chemical unsaturation represented by one double bond for each $C_5H_8$ group. The term "isomer of rubber" is defined for the purposes of this application as a substance derived from rubber and having as its main constituent a hydrocarbon of the same carbon and hydrogen ratio as in rubber, namely, $C_5H_8$, which hydrocarbon has a less chemical unsaturation than rubber.

I claim:

1. An adhesive composition having superior surface adhesion to metal, wood, glass, concrete, leather, rubber, etc., comprising an artificial isomer of rubber having less chemical unsaturation than rubber mixed with a relatively small proportion of a nitrogenous, organic age-resister.

2. As an adhesive, a mixture of tough, balata-like and hard, friable, artificial isomers of rubber.

3. An adhesive composition comprising a balata-like artificial isomer of rubber having less chemical unsaturation than rubber mixed with a relatively small proportion of a nitrogenous, organic age-resister selected from the group which includes the thiourea of dimethylparaphenylenediamine, 1.8 naphthylene-diamine, aldol-alphanaphthylamine and benzidine.

In witness whereof I have hereunto set my hand this 6th day of February, 1925.

WILLIAM C. GEER.